United States Patent
Sapp, II et al.

(10) Patent No.: US 10,054,943 B2
(45) Date of Patent: Aug. 21, 2018

(54) CONTROL SYSTEM FOR UNMANNED AERIAL VEHICLE UTILIZING PARALLEL PROCESSING ARCHITECTURE

(71) Applicant: Hoverfly Technologies, Inc., Winter Springs, FL (US)

(72) Inventors: George Richard Sapp, II, Orlando, FL (US); Alfred D. Ducharme, Oviedo, FL (US); Daniel Burroughs, Casselberry, FL (US); Stacey L. Ducharme, Oviedo, FL (US)

(73) Assignee: Hoverfly Technologies, Inc., Orlando, FL (US)

(*) Notice: Subject to any disclaimer, the term of this patent is extended or adjusted under 35 U.S.C. 154(b) by 175 days.

(21) Appl. No.: 13/659,024

(22) Filed: Oct. 24, 2012

(65) Prior Publication Data

US 2013/0110325 A1   May 2, 2013

Related U.S. Application Data

(60) Provisional application No. 61/551,718, filed on Oct. 26, 2011.

(51) Int. Cl.
*G05D 1/00* (2006.01)
*G05D 1/08* (2006.01)

(52) U.S. Cl.
CPC ......... *G05D 1/0088* (2013.01); *G05D 1/0858* (2013.01)

(58) Field of Classification Search
CPC ............................ G05D 1/0088; G05D 1/0858
See application file for complete search history.

(56) References Cited

U.S. PATENT DOCUMENTS

| 5,423,012 A * | 6/1995 | Sato | G06F 9/30145 |
| | | | 712/204 |
| 2012/0241553 A1* | 9/2012 | Wilke | 244/17.13 |

OTHER PUBLICATIONS

Lara, David, et al. "Real-Time Embedded Control System for VTOL Aircrafts: Application to stabilize a quad-rotor helicopter." Computer Aided Control System Design, 2006 IEEE International Conference on Control Applications, 2006 IEEE International Symposium on Intelligent Control, 2006 IEEE. IEEE, 2006.*

* cited by examiner

*Primary Examiner* — Alan D Hutchinson
(74) *Attorney, Agent, or Firm* — Locke Lord LLP; Howard M. Gitten

(57) ABSTRACT

A UAV has two rotors. First and second sensors sense a first and second type of input respectively. The second type of input is different than the first type, the first sensor providing a first sensor output and the second sensor providing a second sensor output. The first sensor output is input to a first computer and the second sensor output is input to a second computer. The first and second computer communicate in parallel to process the first and second sensor outputs to create a control signal having a predetermined number of variables therein, each variable having an exclusive position within the signal. The first computer outputs a first variable and the second computer outputs a second variable, each output being assigned an exclusive position within the control signal. At least one of the first and second computers outputting the control signal to the rotors.

14 Claims, 3 Drawing Sheets

CONTROL SYSTEM FOR UNMANNED AERIAL VEHICLE UTILIZING PARALLEL PROCESSING ARCHITECTURE

CROSS REFERENCE TO RELATED APPLICATION(S)

This application is a non-provisional U.S. Patent Application, which claims priority to Provisional Patent Application No. 61/551,718, filed Oct. 26, 2011, in its entirety and is hereby incorporated by reference.

BACKGROUND OF THE INVENTION

This invention is directed to the flight control of an unmanned aerial vehicle, and in particular, a system for parallel processing inputs from sensors to control a multi-rotor unmanned aerial vehicle.

Reference is now made to FIG. 1 in which an unmanned aerial vehicle (UAV) generally indicated as 10, as constructed in accordance with the prior art, is shown. UAV 10 is a free floating aerial platform 12. A plurality of rotors 14a, 14b, 14c and 14d in this example are attached to platform 12. Each rotor 14a-14d includes respective motor 16a-16d which is mechanically coupled to a respective propeller 18a-18d. Rotors 14a-14d are operated under the control of the control system 20 as known in the art.

It should be noted that multi-rotor UAVs have, at least for the purposes of the prior art and the invention, at least two rotors. Unlike fixed wing aircraft, a multi-rotor UAV 10 can be controlled with six degrees of freedom. As a result, UAVs 10 lend themselves to applications where other aircraft are not viable. Helicopters also possess this ability to move at six degrees of freedom, but in application provide only moderately stable platforms for applications such as still photography, filming, surveillance, and remote sensing.

Although relatively simplistic in structure, control of flight of a multi-rotor UAV 10 is both subtle and complex. Reference is now made to FIG. 2 in which a control system 20 constructed in accordance with the prior art is provided. Control system 20 includes a computing device or microprocessor 22 at the heart of the system and acts as an onboard inertial motion unit operating on inputs from a variety of sensors. These sensors may include gyroscope array 24, including at least one gyroscope sensor 24a, 24b, 24c for each Cartesian orientation such as the X-X axis, Y-Y axis, and Z-Y axis respectively. Similarly accelerometer sensor array 26 may include respective accelerometers 26a, 26b, 26c for detecting motion in each of the X, Y, and Z axis directions. Magnetometer array 28 includes magnetometers 28a, 28b, 28c for providing inputs for measuring geographical direction and bearing along each of the X axis, Y axis and Z axis. A pressure sensor 30 provides an output for measuring altitude and global positioning system (GPS) 32 provides latitude and longitude inputs to computer 22 and vision sensor 34 provide an input for horizon and absolute ground movement.

Computer 22 processes all of these inputs to provide control signals to each of motorized rotors 14a-14d. Integration of the motion data by computer 22 results in a stable flight for the UAV 10. There are two modes of navigation of a multi-rotor UAV: manual or autonomous. The need for a powerful computer 22 is a function of the mode of operation. In manual operation, a remote control system provides the biasing signals to onboard control system 20 to cause the rotors 14a-14d to move platform 12 in one of six directions: up, down, forward, backward, right and left.

Up and down translations are affected by changes in the overall thrust of the combination of the motorized propellers 18a-18d, i.e., controlling the motor to change the relative speed of one or more propellers 18a with respect to the remaining propellers, or all of the propellers in unison. Lateral motions of right, left, forward and backward are the result of a combination of roll and antiroll of the multi-rotor UAV 10 about either of two orthogonal axis, X or Y.

Autonomous control is achieved using a high level software program running on computer 22. This program utilizes the data provided by the various sensors 24, 26, 28, 30, 32 and 34 and the input data to operate in accordance with a set of rules to provide the needed roll and thrust control actuations to multi-rotor UAV 10. By way of example, one roll may be a navigational waypoint on a pre-selected geographical flight pattern. The program processes the sensor input data and quickly outputs necessary actuation signals in real time in order to provide stable flight. The prior art serially processes the interleaved sensor input signals. This large amount of computer processing requires an expensive sophisticated computer capable of processing multiple dynamic inputs in real time to control a plurality of motors in unison to maintain flights stable enough to support an activity such as video surveillance. As a result, computer 22 is expensive and may require significant real estate upon platform 12. However, serial operation results in some instability even with the use of the high priced computers.

Accordingly, a control system which overcomes the shortcomings of the prior art is desired.

SUMMARY OF THE INVENTION

A UAV having two or more rotors includes a control system having two or more computing devices therein acting in parallel. Each computer receives a respective distinct sensor signal input from one or more distinct types of sensors. Each computer provides an output for controlling a rotor as a function of the received sensor signal. A rotor control signal has a predetermined number of bits. Each of the outputs of the two or more computers is assigned a mutually exclusive respective bit position within the rotor control signal to create the rotor control signal. At least one of the computers outputs the rotor control signal to at least one of the two or more rotors for controlling rotor operation.

DETAILED DESCRIPTION OF THE DRAWINGS

For a fuller understanding of the invention, reference should be made to the following detailed description, taken in connection with the accompanying drawings in which.

DETAILED DESCRIPTION OF THE PREFERRED EMBODIMENT

Figure 1:
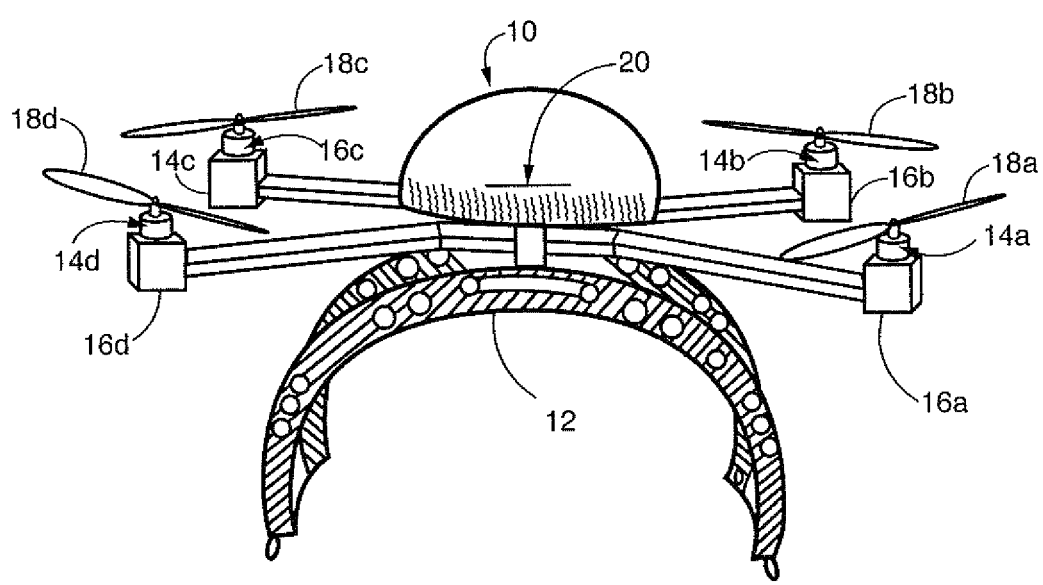
FIG. 1 is a plan view of a multi-rotor unmanned aerial vehicle constructed in accordance with the prior art.
Figure 2:
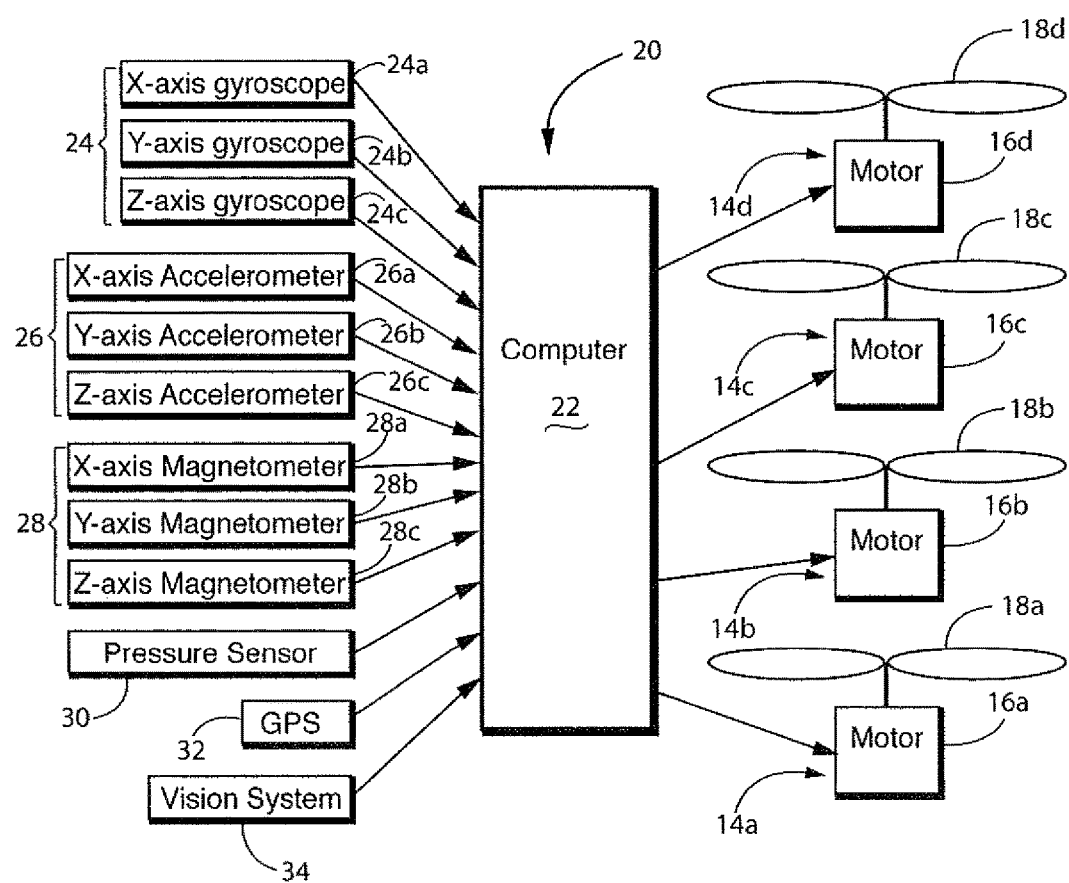
FIG. 2 is a block diagram of a control system for controlling an unmanned aerial vehicle in accordance with the prior art.
Figure 3:
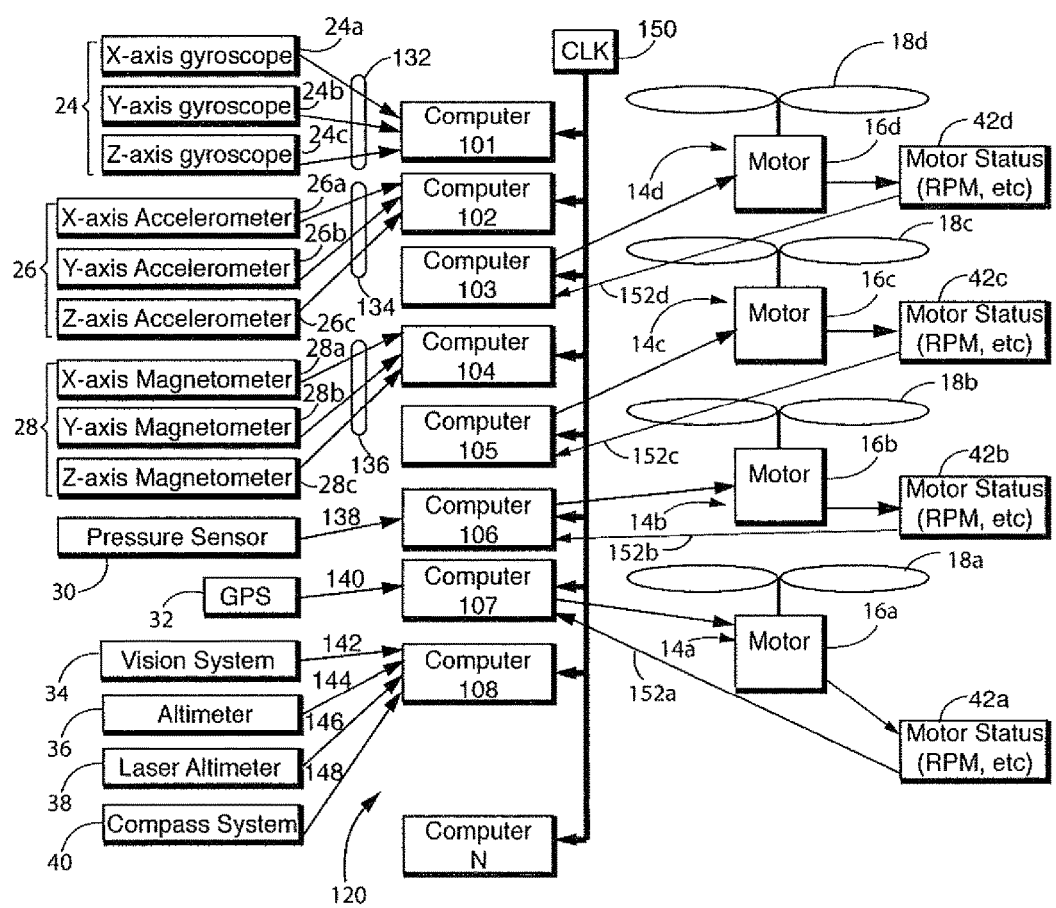
FIG. 3 is a block diagram of a control system for controlling an unmanned aerial vehicle in accordance with the present invention.

Reference is made to FIG. 3 in which a control system, generally indicated as 120, for controlling the flight of UAV 10 in accordance with the invention is provided. Like numerals are utilized to indicate like structure to facilitate description.

It should be noted, that for operation of the inventive system 120, no modification need be made to the sensor or to the rotors. Accordingly, motion sensors includes gyroscope array 24 including a gyroscope 24a for detecting motion relative to the X-axis, a gyroscope 24b for detecting motion relative to the Y-axis and a gyroscope 24c for detecting motion relative to the Z-axis. An accelerometer array 26 has components for detecting acceleration of the X-axis 26a and a sensor 26b for measuring acceleration relative to the Y-axis and a sensor 26c for measuring acceleration in the Z-axis. A magnetometer array 28 is also included and includes X-axis magnetometer 28a, a Y-axis magnetometer 28b and Z-axis magnetometer 28c. The sensors may also include a pressure sensor 30, a GPS sensor 32, and a vision system 34, all of which provide respective sensor signal outputs as a function of the respective sensed conditions. As is readily seen, each different type of sensor is responsible for monitoring a different type of flight related characteristic.

Controller 120 includes two or more computers, each working in parallel. In accordance with the invention, there are N computers, where N is greater than or equal to 2. At least one respective computer 101, 102, 103, 105, 106, 107, 108 through N is dedicated to a respective type of each different type of sensor. For the purposes of this disclosure type of sensor means those sensors having a common functionality, such that gyroscopes 24 represent one type of functionality, accelerometer 26 represents a second type of functionality, magnetometer 28 represents a third type of functionality, pressure sensor 30 is a fourth type of functionality, GPS detector 32 is a fifth type of functionality, and vision system 34 is a sixth type of functionality.

It should be noted, that each different type of sensor provides an output to a single computer. So by way of example, gyroscope array 24 provides a sensor signal as an output 132 only to computer 101. Accelerometer array 26 provides a sensor signal as an output 134 to computer 102. Similarly, magnetometer array 28 provides a sensor signal as an output 136 to computer 104 while pressure sensor 30 provides a sensor signal as an output 138 to computer 106, GPS 32 provides a sensor signal as an output 140 to computer 107, and vision system 34 provides a sensor signal as an output 142 to computer 108. Additionally, altimeters such altimeter 36 which provides a sensor signal 144 to computer 108 and laser altimeter 38 provides a sensor signal to computer 108, and compass system 40 providing additional directional and positional information as a sensor signal 148 to computer 108.

In addition to positional information, motor status may be used as feedback input to control the individual motors 18a-18d. Respective motor status sensors 42a-42d monitor a respective motor 16a-16d and monitor rotations per minute, the voltage and current of the operating motor, and even blade tilt. These sensor parameters are input as a respective sensor signal 152a-152d to one or more of the computers such as computer 107, computer 106, computer 105 and computer 103 by way of non-limiting example. A feedback loop is formed in the sense that the control signal, discussed in greater detail above, output to each motor 16a-16d is in fact a suggested rotational rate. In real world application, the control signal does not always result in the desired rotation. By monitoring motor 16, confirmation of actual compliance of the motor with the control signal, or adjustments need for any deviation from the intended operation, may be determined. Furthermore, by monitoring the current of the respective motor 16a-16d, it is possible to predict motor failure and shut down a respective motor prior to the motor becoming more severely damaged.

It should be noted that these inputs of a single sensor type to a single computer may be arranged either through dedicated hard wiring of circuitry or under software switching control. Similarly, it becomes apparent that in the non-limiting embodiment shown in FIG. 3, that there may be some computers which receive no output such as computer N.

A data bus 50 is in communication with each of computers 101-N. It should be noted, that computers 101-N may be any processing device capable of receiving a sensor signal as an input and produce at least a portion of a control signal in response thereto as discussed below. Through data bus 50, each of computers 101-N communicate with each other. In one embodiment, bus 50 may communicate with each of rotors 14a-14d and control the rotors 14 by controlling motors 16 and/or pitch and other angles of propellers 18.

A rotor control signal for controlling a respective one of each of rotors 14a-14d is structured to have a predetermined number of data variables (M) which are considered to be shared amongst all the computers 101-N communicating along bus 50. Each computer 101-N is responsible for a predetermined number K of the variables (less than M) of the rotor control signal. Each independent computer 101-N provides a predefined number K of the M variables making up a rotor control signal in response to the sensor signal inputs. These variables may be values corresponding to the'sensor signal inputs, a change over a predetermined time period in the sensor signal inputs, or a null set if no change or no input occurs; an accelerometer in a prolonged hover state by way of non-limiting example. By way of non-limiting example, computer 101 may output sixteen variables along bus 50 in response to input sensor signals 132 from gyroscope array 24 while computer 102 only outputs K variables in response to inputs from accelerometer array 26.

In one exemplary, but non-limiting embodiment, the rotor control signal is formatted so that the K variables corresponding to the respective different types of sensor signal inputs are always at the same bit position within the rotor control signal representing the M data variables. So by way of simplified non-limiting example, the output from computer 101 may be the first K bits of the control signal while the output from computer 102 corresponding to the accelerometer sensor array 26 may be the second group of K bits within the rotor control signal. In this way, each computer has specific variables that it provides to the data bus to be in a predetermined portion of the rotor control signal. In this way, the sensor signals are acted upon in real time simultaneously as each of computers 101-108 act in parallel in response to their respective sensor inputs to build the rotor control signal transmitted along bus 50. It should be noted that the outputs of the computers 101-N which do not communicate directly with rotors 14 are described as having K bits for ease of description; however, the number of bits output by these computers need not be equal in number.

Because each computer 101-N is responsible for only a portion of rotor control signal, rotor control signal is built more rapidly utilizing less complex processors.

It follows that as all of computers 101-N communicate with bus 50, a single computer can send information to any other computer or a select number of computers. One computer can send information to all the other computers along data bus 50. As a result, a predetermined one of computers 101-N would have the ability to write information into these variables making up the rotor control signal at the predetermined locations within the data stream and read the remaining variables within the data stream making up the rotor control signal. In one exemplary, but non-limiting example, the data variables may be read at a rate of 400 Hz so that reading and writing of a variable occurs every 2.5 milliseconds. The only boundary to this data rate is the processing rate of each of computers 101-N. As a result each computer 101-N is not required to read or write a new variable every 2.5 milliseconds. Longer integer periods may be used.

A clock 150 communicates with each of computers 101-N along bus 50 to coordinate operation of computers 101-N. In an exemplary embodiment, a preprogrammed flight plan may be stored in computer N. During flight, each computer 101-N receives clock signals from clock 150. Along the route, computer 101 may receive a sensor signal input 132 from gyroscope array 24 indicating relative motion along the three coordinate axes. Computer 101 outputs the K data variables as a function of input 132 at an appropriate clocked time into the data variable place holder within the M variables of rotor control signal assigned to computer 101.

Simultaneously, accelerometer sensor array 26 is determining the acceleration of UAV 10 and provides an acceleration output as sensor signal 134 to be processed by computer 102 which, as a function thereof, outputs a predetermined number $K_2$ of data variables into the data stream of the rotor control signal at a predetermined time corresponding to a predetermined bit position. The same is true of magnetometer array 28, which provides a sensor signal output 134 to computer 104, pressure sensor 30, which provides a sensor signal output 138 to computer 106, GPS 32 which provides a positioning output as a sensor signal 140 to computer 107, and vision system 34, which provides a sensor signal output 142, altimeter 36 outputting a sensor signal 144, laser altimeter 38 outputting a sensor signal 146, and compass system 40 outputting a sensor signal 146, all to computer 108. Similarly, motor status sensors 42a-42d output sensor signals 152a-152d to respective computers 107, 106, 105, 103 by way of non-limiting example. All of the sensors output $K_n$ bits of data (variables) to be placed in the rotor control signal at the predetermined position as discussed above.

Each of independent computer 101-N has the ability to simultaneously perform receiving the sensor signal input and outputting the expected K data variables as well to perform other mathematical operations. A master processing computer such as computer N or computer 108 may be chosen as a function of hard wiring or software control to produce the meaningful information, i.e., control assembly of the rotor control signal. However, as demonstrated a distributed computational network is also created as a function of software control.

Furthermore, as a function of firmware, hard wiring or software control, a master computer, N by way of example, may provide the control signals to the respective rotors 14a-14d through bus 50 or an alternative hard wired or wireless communication pathway. Alternatively, a number of computers 101-N may each be assigned a respective one of the rotors to provide the control signal thereto. By way of example, as shown in FIG. 3, computer 107 may provide a rotor control signal to rotor 14a. Computer 106 provides a rotor control signal to rotor 14b while computer 105 provides a rotor control signal to rotor 14c, and computer 102 may provide a rotor control signal to rotor 14d or, the control signal may be sent by a single computer, computer N, along bus 50 to communicate with all four rotors 14 simultaneously. In this way, simultaneous control of two or more rotors in a UAV is provided.

Any sensor or plurality of sensors and/or motors can be controlled by any of the processing computers. This can be done either by hard wire changes or software control. It should be understood, that because of the distribution of computational power, additional output devices may be included in the system. For example, a single transmitter such as WiFi, 4G or other radio frequency (RF) may be provided on platform 12 under the control of any one of computers 101-N. Onboard data output systems such as a liquid crystal display, light emitting diode or the like may be mounted on platform 12 to provide information to a local user.

As a result of the parallel structure, inherent redundancy is provided as the various computers may be enabled or disabled at shift processing inputs and outputs. So for example, a duplication of processing computers, such as computer N and a computer 103 providing the same functionality. In this way, if certain connections, sensor failures or computer failures occur, additional resources are enabled to offload processing to working sensors and computers, all as a function of the parallel operation and intercommunication along bus 50.

The actual chip architecture may be formed so that computers are individual processing chips which communicate with an input/output chip and each other along bus 50. A hub in this non-limiting embodiment represented by computer N communicates with each of computers 101-108 through bus 50 to control the operation of control system 120 under the timing of a clock 150.

Alternatively, the circuitry of control system 120 can be formed as a chip in a hub and spoke interaction in order to conserve physical space on the platform 12.

By providing a plurality of onboard computers, each responsible for processing a respective type of sensor input and providing only a portion of the rotor control signal, it is possible to utilize a plurality of less expensive smaller computing devices for the simultaneous control of the rotors of the UAV. By providing a bus in communication with each of the plurality of computers, the computers are enabled to collectively create a sophisticated rotor signal by only outputting a portion of the rotor signal for which they are responsible.

While this invention has been particularly shown and described with reference to the preferred embodiments thereof, it will be understood by those skilled in the art that various changes in form and detail may be made therein without departing from the spirit and scope of the invention encompassed by the appended claims.

What is claimed as new and desired to be protected by Letters Patent of the United States is:

1. An unmanned aerial vehicle comprising:
   a platform;
   a first rotor and at least a second rotor disposed on the platform;
   a first sensor for sensing a first type of flight related characteristic and at least a second sensor for sensing at least a second type of flight related characteristic, the first sensor and at least second sensor being disposed on the platform, the second type of characteristic being different than the first type of characteristic, the first sensor providing a first sensor signal output as a function of the first flight related characteristic and the second sensor providing at least a second sensor signal output as a function of the second type of flight related characteristic; and
   at least a first computer and at least a second computer disposed on the platform, the first sensor providing the first sensor signal output to at least one of the first computer and the second computer to create a first computer signal in response thereto, and the second sensor providing the second sensor signal output to at least the other of the second computer and the first computer to create a second computer signal in response thereto, the first computer communicating with the at least second computer to process the first sensor signal output and the second sensor signal output simultaneously and in parallel to create a rotor control signal, the rotor control signal containing the first computer signal and the second computer signal, to control a first rotational speed of the first rotor and at least a second rotational speed of the at least second rotor.

2. The unmanned aerial vehicle of claim 1, further comprising a bus, the first computer communicating with the at least second computer along the bus.

3. The unmanned aerial vehicle of claim 1, further comprising a third computer communicating with the first computer and second computer, the third computer controlling operation of the first computer and the at least second computer and providing the rotor control signal to at least one of the first rotor and at least second rotor.

4. The unmanned aerial vehicle of claim 1, wherein the rotor control signal has a predetermined number of variables therein, each variable having a predetermined position within the rotor control signal, each position corresponding to a specific computer signal, being mutually exclusive of an other position within the control signal, and further comprising a clock, the clock outputting clock signals to the first computer and second computer, the first computer and second computer determining the mutually exclusive variable position within the rotor signal as a function of the clock signal.

5. The unmanned aerial vehicle of claim 1, wherein the first sensor is one of a gyroscope, accelerometer, magnetometer, pressure sensor, geopositioning satellite sensor, and vision system.

6. The unmanned aerial vehicle of claim 1, wherein the second sensor is one of a gyroscope, accelerometer, magnetometer, pressure sensor, geopositioning satellite sensor, and vision system.

7. A control system for controlling the fight of an unmanned aerial vehicle, by controlling rotational speed of rotors to control vehicle thrust, the aerial vehicle having two or more rotors, comprising:
  a first sensor for sensing a first type of flight related characteristic;
  at least a second sensor for sensing at least a second type of flight related characteristic, the first sensor and at least second sensor, the second type of characteristic being different than the first type of characteristic, the first sensor providing a first sensor signal output as a function of the first flight related characteristic and the second sensor providing at least a second sensor signal output as a function of the second type of flight related characteristic; and
  at least a first computer; and
  at least a second computer, the first sensor providing the first sensor signal output to at least one of the first computer; and the second computer to create a first computer signal in response thereto, and the second sensor providing the second sensor signal output to the other of the first computer and the second computer to create a second computer signal in response thereto, the first computer communicating with the at least second computer to process the first sensor signal output and the second sensor signal output simultaneously and in parallel to create a rotor control signal, the first computer signal and the second computer signal forming the rotor control signal, to control a first rotational speed of the first rotor and a second rotational speed of an at least second rotor to create a thrust differential between at least the first rotor and the second rotor.

8. The control system of claim 7, further comprising a bus, the first computer communicating with the at least second computer along the bus.

9. The control system of claim 7, further comprising a third computer communicating with the first computer and second computer, the third computer controlling operation of the first computer and the at least second computer and providing the rotor control signal to at least one of the first rotor and at least second rotor.

10. The control system of claim 7, wherein the rotor control signal has a predetermined number of variables therein, each variable having a predetermined position within the rotor control signal, each position corresponding to a specific computer signal, being mutually exclusive of an other position within the control signal, and further comprising a clock, the clock outputting clock signals to the first computer and second computer, the first computer and second computer determining the mutually exclusive variable position within the rotor signal as a function of the clock signal.

11. The control system of claim 7, wherein the first sensor is one of a gyroscope, accelerometer, magnetometer, pressure sensor, geopositioning satellite sensor, and vision system.

12. The control system of claim 7, wherein the second sensor is one of a gyroscope, accelerometer, magnetometer, pressure sensor, geopositioning satellite sensor, and vision system.

13. The unmanned aerial vehicle of claim 1, wherein the rotor control signal has a predetermined number of variables therein, each variable having a predetermined position within the rotor control signal, the first computer outputting a first variable and the at least second computer outputting at least a second variable, each output of the first computer and the second computer being assigned a mutually exclusive variable position within the rotor control signal to build the rotor control signal, and at least one of the first computer and at least second computer outputting the rotor control signal to at least one of the first rotor and at least second rotor.

14. The control system of claim 7, wherein the rotor control signal has a predetermined number of variables therein, each variable having a predetermined position within the rotor control signal, the first computer outputting a first variable and the at least second computer outputting at least a second variable, each output of the first computer and the second computer being assigned a mutually exclusive variable position within the rotor control signal to build the rotor control signal, and at least one of the first computer and at least second computer outputting the rotor control signal to an at least two or more rotors.

* * * * *